Feb. 23, 1937. M. WEFERS 2,071,599
TESTER FOR INTERNAL COMBUSTION ENGINES
Filed Sept. 6, 1935
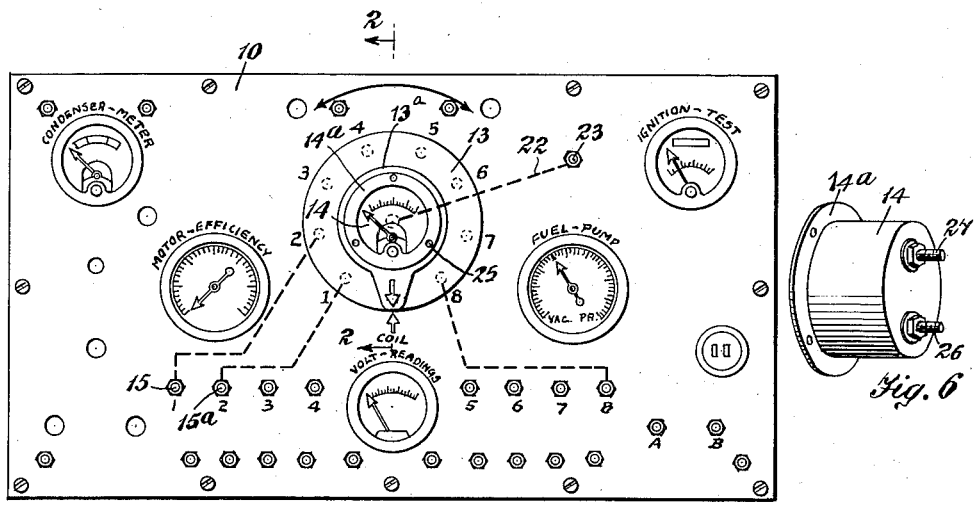
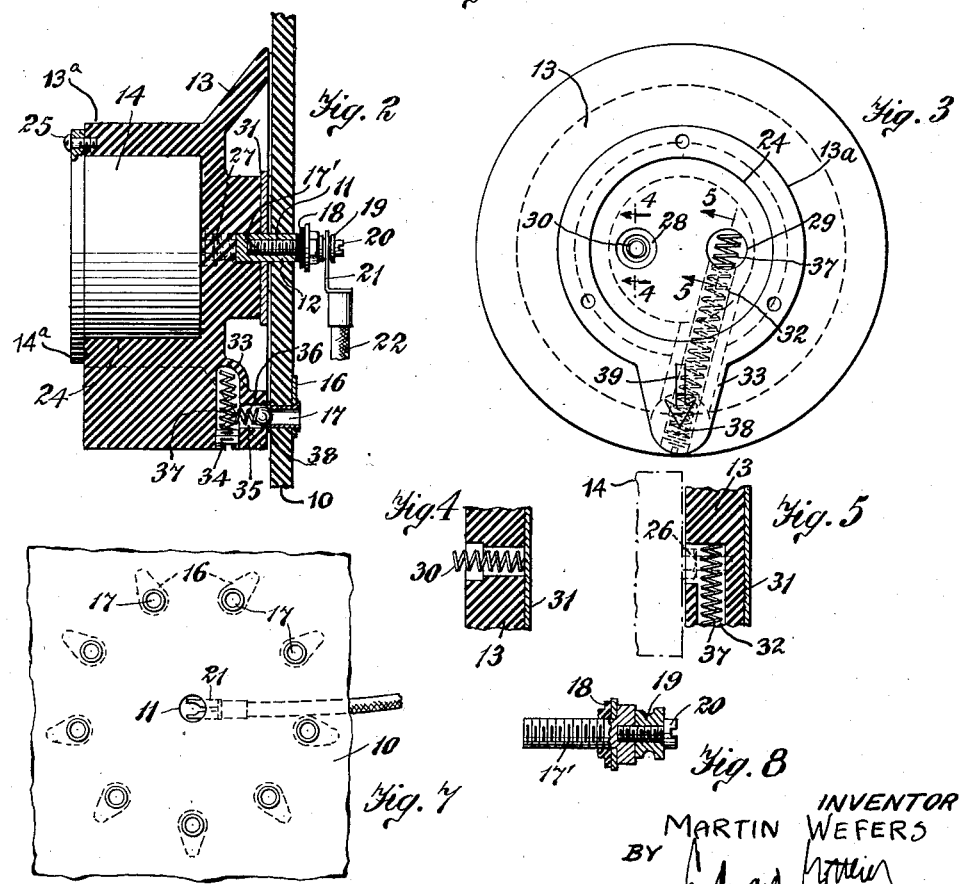
INVENTOR
MARTIN WEFERS
BY
ATTORNEY Patented Feb. 23, 1937

2,071,599

UNITED STATES PATENT OFFICE 2,071,599

TESTER FOR INTERNAL COMBUSTION ENGINES

Martin Wefers, Union, N. J.

Application September 6, 1935, Serial No. 39,395

3 Claims. (Cl. 175—183)

This invention relates to new and useful improvements in a tester for internal combustion engines.

The invention has for an object the correcting of defects in design and construction of testers for internal combustion engines which are adapted to determine whether there is a circuit through the spark plugs from the conductor to the ground and the coil, and if there is a circuit, whether it is producing a normal operative spark or an impaired ignition.

In prior devices it has been customary to use indicating devices such as lamps, neon lamps, etc., which gave no accurate readings but required guessing as to approximate results.

It is an object of this invention to make use of a meter for accurately measuring the strength of currents passing in the circuits.

Still further, the invention particularly proposes a novel arrangement for mounting the meter upon a dial, and a novel arrangement for the circuits from the tester to the dial.

Another object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features are more particularly set forth.

In the accompanying drawing forming a material part of this disclosure:—

Fig. 1 is a plan view of a tester which embodies this invention.

Fig. 2 is a fragmentary enlarged sectional view taken on the line 2—2 of Fig. 1.

Fig. 3 is a plan view of the dial used in the device, with the meter thereof removed.

Fig. 4 is a fragmentary enlarged sectional view taken on the line 4—4 of Fig. 3.

Fig. 5 is a fragmentary enlarged sectional view taken on the line 5—5 of Fig. 3.

Fig. 6 is a perspective view of the meter per se.

Fig. 7 is a fragmentary view of a portion of the panel shown in Fig. 1, but illustrating it with the dial removed so that the contacts thereon may be seen.

Fig. 8 is a fragmentary sectional view showing details of the screw used to hold the dial in position.

The tester in Fig. 1 includes a panel 10 upon which the various apparatus for testing is mounted. This invention particularly relates to the apparatus for testing the spark plug circuits and the coil. It consists in forming the panel 10 with an opening 11 through which a stud 12 projecting from an insulation dial passes. This insulation dial supports a meter 14 and is associated with circuits by which the various spark plug circuits and coil may be selectively connected therewith.

The circuits mentioned in the previous paragraph include plugs 15, 15a, etc., which are wired to clips 16 secured upon the back of the panel 10, by contacts 17 which engage through the panel. These contacts are in the form of eyelets. They are arranged concentric with the opening 11. The dial 13 covers these contacts so that they are hidden from view. The contacts are indicated by numerals on the panel adjacent the dial, as clearly shown in Fig. 1. The plugs 15, 15a, etc., are indicated by corresponding numerals on the panel.

A screw 17' threadedly engages into the stud 12 and serves to hold the dial against displacement. An insulation washer 18 is mounted upon the screw 17' and engages against the end of the stud 12. The screw 17' may be a conventional cap screw. A bushing 19 is mounted upon the head of the cap screw by a small screw 20. This bushing is adapted to be engaged by a clip 21 upon the end of the ground cable 22. The ground cable 22 may be wired with a ground plug 23 for connection with the ground of the engine.

The dial 13 has an enlarged central portion 13a which is formed with a cylindrical opening 24 into which the meter 14 fits. The meter 14 has a flange 14a through which several screws 25 engage by which the meter is attached on the dial. The meter 14 is of conventional design, preferably a milliampere meter having contacts 26 and 27 by which the meter may be connected in the circuits. The base of the opening 24 is provided with spaced recesses 28 and 29 in which the contacts 26 and 27 engage. A spring 30 is mounted in one of the recesses 28 and extends through a passage through the dial 13 and contacts with a metal disc 31 which is on the hub portion of the dial 13 and electrically connected with the stud 12. The disc 31 preferably should be soldered or brazed to the stud to form a good electrical connection. Thus, the ground lead 22 is connected with the ground contact of the meter.

The recess 29 communicates with a transverse passage 32 extending through a boss 33 on the underside of the dial to the periphery thereof.

The outer end of this recess is closed with an insulation plug 34. Near the outer end, a passage 35 communicates with the passage 32. A spring 36 is disposed in the passage 35 and contacts with a spring 37 disposed in the passage 32. A ball socket 38, constituting a master contact, is set into the mouth of the opening 35 and is urged downwards against the panel and the contacts thereon by the spring 36. The positive contact of the meter 14 engages the spring 37 and so the circuit is closed to the master contact 38. The dial 13 may be turned to various position so as to connect the master contact 38 with anyone of the contacts 17. An indicating arrow 39 is imprinted with the dial 13 to give the location of the master contact 38 so that the circuit may be closed through any one of the contacts 17 desired.

Fig. 3 shows the meter removed so that the springs which connect with the contacts thereof may be easily seen. In Fig. 5 the dot and dash lines indicate a portion of the meter to show the manner in which the contact connects with the spring 37.

The operation of the device is as follows:—
Cables for the purpose are plugged into the plugs 15, 15a, etc., and are connected with the spark plugs; and the ground 23 connected with the coil. The engine is then operated and the dial 13 turned to test the various spark plugs and their circuits. A feature of the invention resides in the fact that the meter 14 indicates the strength of the current and it may easily be determined without guesswork whether the spark plugs and coil are functioning properly. A further feature of the invention is the novel mounting of the dial 13 by the use of the stud 12, and the manner in which the stud makes rotative contact with the ground connection. A further feature of the invention is the arrangement of the springs within the dial for making contact with their associated parts.

Fig. 1 shows the panel 10 equipped with numerous other meters, gauges, plugs, etc. These form no part of the invention and therefore no detailed description of them will be given in this specification.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A tester for internal combustion engines, comprising a panel with an opening, a plurality of contacts mounted through said panel concentric with said opening for connection with plugs, an insulation dial on the outer face of said panel and having a passage extending from near the periphery to near the center and also having a stud extending through said opening, a screw engaging said stud for rotatively holding said dial, a ground connection rotatively connected with said screw, a meter mounted on said dial and having a pair of contacts extending into a pair of openings in said dial, one of which communicates with said passage, a conductor disc connected with said stud, a spring in one of said pair of openings and contacting with one of said pair of contacts and with said conductor disc, another spring in said passage contacting with the other of said pair of contacts, a master contact mounted on said dial and adapted to engage said contacts selectively as the dial is turned, and connecting with said latter spring, whereby the master contact, the meter and said stud are connected in series.

2. A tester for internal combustion engines, comprising a panel with an opening, a plurality of contacts mounted through said panel concentric with said opening for connection with plugs, an insulation dial on the outer face of said panel and having a stud extending through said opening, a screw engaging said stud for rotatively holding said dial, a bushing mounted on said screw, a ground connection rotatively connected with said bushing, a meter mounted on said dial, a master contact mounted on said dial and adapted to engage said contacts selectively as the dial is turned, and a circuit connecting said master contact in series with said meter and stud, said ground including a clip engageable upon said bushing.

3. A tester for internal combustion engines, comprising a panel with an opening, a plurality of contacts mounted through said panel concentric with said opening for connection with plugs, an insulation dial on the outer face of said panel and having a stud extending through said opening, a screw engaging said stud for rotatively holding said dial, a bushing mounted on said screw, a ground connection rotatively connected with said bushing, a meter mounted on said dial, a master contact mounted on said dial and adapted to engage said contacts selectively as the dial is turned, and a circuit connecting said master contact in series with said meter and stud, said ground including a clip engageable upon said bushing, said screw serving to rotatively hold the dial in position, and an insulation washer being mounted upon the screw and engaging against the end of said stud.

MARTIN WEFERS.